(12) United States Patent
Moritz et al.

(10) Patent No.: US 6,934,865 B2
(45) Date of Patent: Aug. 23, 2005

(54) CONTROLLING A PROCESSOR RESOURCE BASED ON A COMPILE-TIME PREDICTION OF NUMBER OF INSTRUCTIONS-PER-CYCLE THAT WILL BE EXECUTED ACROSS PLURAL CYCLES BY THE PROCESSOR

(75) Inventors: Csaba Andras Moritz, Amherst, MA (US); Mani Krishna, Northampton, MA (US); Israel Koren, Amherst, MA (US); Osman Sabri Unsal, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 10/191,775

(22) Filed: Jul. 9, 2002

(65) Prior Publication Data

US 2004/0010679 A1 Jan. 15, 2004

(51) Int. Cl.$^7$ ................................................ G06F 1/32
(52) U.S. Cl. ..................... 713/324; 713/320; 713/322
(58) Field of Search ................................. 713/320, 322, 713/323, 324, 300; 712/23, 24; 717/140, 141, 149, 154, 119, 150, 151, 152

(56) References Cited

U.S. PATENT DOCUMENTS

| | | |
|---|---|---|
| 5,410,669 A | 4/1995 | Biggs et al. |
| 5,630,143 A | 5/1997 | Maher et al. |
| 5,655,124 A | 8/1997 | Lin |

(Continued)

OTHER PUBLICATIONS

International Search Report.

Abraham et al., "Automatic and Efficient Evaluation of Memory Hierarchies for Embedded Systems", Hewlett–Packard Laboratories, Palo Alto, CA (undated).

Advanced Micro Devices, Inc., "Real–World Application Performance", QuantiSpeed Architecture, Sep. 2001.

Albonesi, David H, "Selective Cache Ways: On–Demand Cache Resource Allocation." Department of Electrical and Computer Engineering, University of Rochester, Rochester, NY (undated).

Anderson et al., "Physical Design of a Fourth–Generation POWER GHz Microprocessor", Digest of Technical Papers, pp. 232–233, 451, 2001 IEEE International Solid–State Circuits Conference.

Bahar et al., "Power and Energy Reduction Via Pipeline Balancing", IEEE 2001.

Baniasadi et al., "Instruction Flow–Based Front–end Throttling for Power–Aware High–Performance Processors", pp. 16–21, ISLPED '01, Aug. 6–7, Huntington Beach, CA.

(Continued)

*Primary Examiner*—John R. Cottingham
*Assistant Examiner*—Paul Yanchus, III
(74) *Attorney, Agent, or Firm*—Fish & Richardson P.C.

(57) ABSTRACT

A method, for use in a processor, includes estimating a number of instructions-per-cycle that will be executed by the processor based on static compile-time information extracted during compilation, and controlling a resource of the processor based on the estimated number of instructions-per-cycle. The resource may be a component of the processor that is controlled by throttling or deactivating the component.

51 Claims, 4 Drawing Sheets

U.S. PATENT DOCUMENTS

| | | | |
|---|---|---|---|
| 5,704,053 | A | 12/1997 | Santhanam |
| 5,774,685 | A | 6/1998 | Dubey |
| 5,805,907 | A | 9/1998 | Loper et al. |
| 5,857,104 | A | 1/1999 | Natarjan et al. |
| 5,864,697 | A | 1/1999 | Shiell |
| 5,875,464 | A | 2/1999 | Kirk |
| 5,933,860 | A | 8/1999 | Emer et al. |
| 5,949,995 | A | 9/1999 | Freeman |
| 5,966,544 | A | 10/1999 | Sager |
| 6,105,139 | A | 8/2000 | Dey et al. |
| 6,219,796 | B1 | 4/2001 | Bartley |
| 6,256,743 | B1 | 7/2001 | Lin |
| 6,272,676 | B1 * | 8/2001 | Haghighat et al. .......... 717/150 |
| 6,334,175 | B1 | 12/2001 | Chih |
| 6,393,520 | B2 | 5/2002 | Yoshikawa et al. |
| 6,412,105 | B1 * | 6/2002 | Maslennikov et al. ...... 717/151 |
| 6,430,693 | B2 | 8/2002 | Lin |
| 6,446,181 | B1 | 9/2002 | Ramagopal et al. |
| 6,529,943 | B1 | 3/2003 | Ohi |
| 6,539,543 | B1 * | 3/2003 | Guffens et al. ............. 717/161 |
| 6,574,740 | B1 * | 6/2003 | Odaohhara et al. ......... 713/323 |
| 6,625,740 | B1 * | 9/2003 | Datar et al. ................. 713/324 |
| 6,675,305 | B1 | 1/2004 | Mohammad |
| 6,687,838 | B2 | 2/2004 | Orenstien et al. |
| 6,795,781 | B2 | 9/2004 | Aldridge et al. |
| 6,826,652 | B1 | 11/2004 | Chauvel et al. |
| 2001/0044891 | A1 | 11/2001 | McGrath et al. |
| 2004/0010782 | A1 | 1/2004 | Moritz et al. |
| 2004/0010783 | A1 | 1/2004 | Moritz et al. |
| 2004/0205740 | A1 | 10/2004 | Lavery et al. |

OTHER PUBLICATIONS

Bechade et al., "A 32b 66MHz 1.8W Microprocessor", Digest of Technical Papers, pp. 208–209, 1994 International Solid–State Circuits Conference.

Benini, et al., "A Recursive Algorithm for Low–Power Memory Partitioning", pp. 78–83, ISLPED '00, Rapallo, Italy.

Brooks et al., "Wattch: A Framework for Architectural–Level Power Analysis and Optimizations", pp. 83–94, ISCA 2000, Vancouver, Canada.

Burger et al., "The SimpleScalar Tool Set, Version 2.0", University of Wisconsin–Madison (undated).

Buyuktosunoglu et al., "An Adaptive Issue Queue for Reduced Power at High Performance" *Power–Aware Computer Systems, First International Workshop, PACS 2000*, Cambridge, MA Nov. 2000.

Calder et al., "Fast & Accurate Instruction Fetch and Branch Prediction", University of Colorado, pp. 2–11, IEEE 1994.

Calder et al., "Next Cache Line and Set Prediction", pp. 287–296, ISCA 1995, Santa Margherita, Liqure, Italy.

Cantin et al., "Cache Performance for Selected SPEC CPU2000 Benchmarks", Computer Architecture News, vol. 29, No. 4, pp. 13–18, Sep. 2001.

Chiou et al., "Application–Specific Memory Management for Embedded Systems Using Software–Controlled Caches", pp. 416–419, DAC 2000, Los Angeles, CA.

Cooper et al., "Compiler–Controlled Memory", ACM SIGPLAN, vol. 33, No. 11, pp. 2–11, Nov. 1998.

Delaluz et al., "Energy–Oriented Compiler Optimizations for Partitioned Memory Architectures", Pennsylvania State University (undated).

http://www.eecs.harvard.edu/hube/software/software.html.

Falsafi et al., "Power–Aware Computer Systems", First International Workshop, PACS 2000, Cambridge, MA, (Revised Papers), pp. 24–39, Nov. 12, 2000.

Folegnani et al., "Energy–Effective Issue Logic", Barcelona, Spain, IEEE 2001.

Ghiasi et al., "Using IPC Variation in Workloads with Externally Specified Rates to Reduce Power Consumption", pp. 1–10, University of Colorado (undated).

Gowan et al., "Power Considerations in the Design of the Alpha 21264 Microprocessor", pp. 726–731, DAC 98, San Francisco, CA.

Henry et al., "Circuits for Wide–Window Superscalar Processors", pp. 236–247, ISCA 2000, Vancouver BC Canada.

Hinton et al., "The Microarchitecture of the Pentium® 4 Processor", Intel Technology Journal Q1, pp. 1–13, 2001.

Huang et al., "Data Cache Decomposition for Energy Efficiency", ISLPED '01, Proceedings of the 2001 International Symposium on Low Power Electronics and Design, pp. 10–15, Aug. 6–7, 2001.

Intel, "Intel® StrongARM SA–1110 Microprocessor", Brief Datasheet, pp. 1–9, Apr. 2000.

Jain et al., "A 1.2Ghz Alpha Microprocessor with 44.8GB/s Chip Pin Bandwidth", Digest of Technical Papers, pp. 240–241, 2001 IEEE International Solid–State Circuits Conference.

Kever et al., "A 200MHz RISC Microprocessor with 128kB On–Chip Caches", Digest of Technical Papers, pp. 410–411, 495, 1997 IEEE International Solid–State Circuits Conference, Feb. 8, 1997.

Kin et al., "The Filter Cache: An Energy Efficient Memory Structure", MICRO–30, Proceedings of the $30^{th}$ Annual International Symposium on Microarchitecture, pp. 184–193, Dec. 1–3, 1997.

Kowalczyk et al., "First–Generation MAJC Dual Microprocessor", Digest of Technical Papers, pp. 236–237, 451, 2001 IEEE International Solid–State Circuits Conference, Feb. 6, 2001.

Kulkarni et al, "Advanced Data Layout Optimization for Multimedia Applications", (undated).

Lam et al., "Limits of Control Flow on Parallelism", Stanford University, pp. 46–57, 1992.

Larsen et al., "Exploiting Superword Level Parallelism with Multimedia Instruction Sets", pp. 145–156, PLDI 2000, Vancouver, British Columbia, Canada.

Lee et al., "MediaBench: A Tool for Evaluating and Synthesizing Multimedia and Communications System", University of California, pp. 330–335, (undated).

Lee et al., "Region–Based Caching: An Energy–Delay Efficient Memory Architecture for Embedded Processors", CASES '00, Nov. 17–18, 2000, San Jose, CA.

Leenstra et al., "A 1.8 GHz Instruction Window Buffer", Digest of Technical Papers, pp. 314–315, 459, 2001 IEEE International Solid–State Circuits Conference, Feb. 7, 2001.

Manne et al., "Pipeline Gating: Speculation Control for Energy Reduction", University of Colorado (undated).

Marculescu, Diana, "Profile–Driven Code Execution for Low Power Dissipation", pp. 253–255, ISLPED '00 Rapallo, Italy.

Maro et al., "Dynamically Reconfiguring Processor Resources to Reduce Power Consumption in High–Performance Processors", pp. 97–111, PACS 2000, 2001.

Memik et al., "A Selective Hardware/Compiler Approach for Improving Cache Locality", Northwestern University, pp. 1–21 (undated).

Michaud et al., "Data-Flow Prescheduling for Large Instruction Windows in Out-of-Order Processors", pp. 27–36, 2001 IEEE.

Milutinovic et al., "The Split Temporal/Spatial Cache: Initial Performance Analysis", Proceedings of the SCIzzL–5, Santa Clara, CA, Mar. 26, 1996.

Montanaro et al., "A 160 MHz 32b 0.5W CMOS RISC Microprocessor", Digest of Technical Papers, 1996 IEEE International Solid–State Circuits Conference, pp. 214–215, Feb. 9, 1996.

Moritz et al., "FlexCache: A Framework for Flexible Compiler Generated Data Caching", pp. 135–146, IMS 2000.

Moritz et al., "Hot Pages: Software Caching for Raw Microprocessors", International Symposium for Computer Architecture, ISCA–27, pp. 1–12, Nov. 5, 1999.

Nicolau et al., "Measuring the Parallelism Available for Very Long Instruction Word Architectures", IEEE Transactions on Computers, vol. c–33, No. 11, pp. 968–976, Nov. 1984.

Palacharla et al., "Complexity–Effective Superscalar Processors", pp. 206–218, ISCA '97, Denver, CO.

Panda et al., "Efficient Utilization of Scratch–Pad Memory in Embedded Processor Applications", pp. 7–11, 1997 IEEE.

Parikh et al., "Power Issues Related to Branch Prediction", Proceedings of the $8^{th}$ International Symposium on High–Performance Computer Architecture, HPCA '02.

Ranganathan et al., "Reconfigurable Caches and their Application to Media Processing", pp. 214–224, ISCA 2000, Vancouver, B.C., Canada.

Ponomarev et al., "Reducing Power Requirements of Instruction Scheduling Through Dynamic Allocation of Multiple Datapath Resources", pp. 90–101, 2001 IEEE.

Postiff et al., "The Limits of Instruction Level Parallelism In SPEC95 Applications", University of Michigan (undated).

Sair et al., "Memory Behavior of the SPEC2000 Benchmark Suite", Watson Research Center, pp. 1–8 (undated).

Schlansker et al., "Achieving High Levels of Instruction-–Level Parallelism with Reduced Hardware Complexity", Hewlett Packard Laboratories, pp. 1–85, Nov. 1994.

Sohi et al., "Instruction Issue Logic for High–Performance Interruptable Pipelined Processors", pp. 27–34, 1987 ACM. http://suif.stanford.edu.

The Standard Performance Evaluation Corporation, http://www.spec.org, Nov. 2000.

Tune et al., "Dynamic Prediction of Critical Path Instructions", University of California, pp. 185–195, 2001 IEEE.

Unsal et al., "High–Level Power–Reduction Heuristics for Embedded Real–Time Systems", University of Massachusetts, pp. 1–6, (undated).

Unsal et al., "The Minimax Cache: An Energy–Efficient Framework for Media Processors", Proceedings of the $8^{th}$ International Symposium on High–Performance Computer Architecture, HPCA '02, 2002 IEE.

Unsal et al., "On Memory Behavior of Scalars in Embedded Multimedia Systems", University of Massachusetts, pp. 1–12 (undated).

Unsal et al., "Power–Aware Replication of Data Structures in Distributed Embedded Real–Time Systems", IPDPS 2000 Workshops, pp. 839–846.

Wall, David W., "Limits of Instruction–Level Parallelism", Western Research Laboratory, pp. 176–188, 1991 ACM.

Weber Hammer: The Architecture AMD's of Next–Generation Processors, Microprocessor Forum Oct. 2001.

Wilton et al., "CACTI: An Enhanced Cache Access and Cycle Time Model", Journal of Solid–State Circuits, vol. 31, No. 5, pp. 677–688, May 1996.

Witchel, et al., "Direct Addressed Caches for Reduced Power Consumption", MIT, pp. 124–133, 2001 IEEE.

Zyuban et al., "Inherently Lower–Power High–Performance Superscalar Architectures", IEEE Transactions on Computers, vol. 50, No. 3, pp. 268–285, Mar. 2001.

Aragon, et al., "Power–aware Control Speculation Through Selective Throttling," *Proceedings of $9^{th}$ International Symposium on High Performance Computer Architecture (HPCA)*, 2003.

Ashok, et al., "Coupling Compiler–Enabled and Conventional Memory Accessing for Energy Efficiency," *ACM Transactions on Computer Systems*, 22(2):180–213 (2004).

Unsal, et al., "Cool–Fetch: Compiler–Enabled Power–Aware Fetch Throttling," *IEEE Computer Architecture Letters*, vol. 1, 2002.

Unsal, et al., "Cool–Fetch: A Compiler–Enabled IPC Estimation–Based Framework for Energy Reduction," *Interact–8*, Feb. 2004.

Unsal, et al., "Cool Cache: A Compiler–Enabled Energy Efficient Data Caching Framework for Embedded / Multimedia Processors," *ACM Transactions on Embedded Computing Systems*, 2(3):373–392 (2003).

Unsal, et al., "An Analysis of Scalar Memory Accesses in Embedded and Multimedia Systems," *High Performance Memory Systems*, Springer–Verlag, 2003.

Unsal, et al., "The Minimax Cache: An Energy Efficient Framework for Media Processors," *IEEE*, pp. 131–140 (2002).

International Preliminary Examination Report PCT/US03/20999.

Compaq Computer Corporation, "Compiler Writer's Guide for the Alpha 21264", Digital Equipment Corporation ® 1999.

Folegnani et al., "Energy–Effective Issue Logic", *IEEE*, 10 pgs. (2001).

Furber et al., "Power Saving Features in AMULET2e", Dept. of Computer Science, University of Manchester, UK, 4 pps. (Undated).

Heinrich, J., *MIPS R 10000 Microprocessor's User Manual*, 2nd Ed., MIPS Technologies, Inc. (1996).

Heinrich, J., *MIPS R4000 Microprocessors User's Manual*, 2nd Ed., MIPS Technologies, Inc. (1994).

Inoue et al., "Way–Predicting Set–Associative Cache for High Performance and Low Energy Consumption", (ISLPED'99), *ACM*, pp. 273–275 (1999).

Kaxiras et al., "Cache Decay: Exploiting Generational Behavior to Reduce Cache Leakage Power", *IEEE*, pp. 240–251 (2001).

Pering et al., "Dynamic Voltage Scaling and the Design of a Low–Power Miroprocessor System", UC Berkeley, Electronics Research Laboratory, (Undated).

Powell et al., "Reducing Set–Associative Cache Energy via Way–Prediction and Selective Direct–Mapping", *IEEE*, pp. 54–65 (2001).

Ranganathan et al., "Reconfigurable Caches and their Application to Media Processing", (ISCA'00) *ACM*, pp. 214–224 (2000).

Reinman et al., "An Integrated Cache Timing and Power Model", COMPAQ Western Research Lab, pp. 1–20 (1999).

The Standard Performance Evaluation Corporation, http://www.spec.org, (© 2002).

Yang et al., "An Integrated Circuit/Architecture Approach to Reducing Leakage in Deep–Submicron High–Performance I–Caches", *IEEE*, pp. 147–157 (2001).

Zhang et al., "Highly–Associative Caches for Low–Power Processors", *Kool Chips Workshop, 33rd International Symposium on Microarchitectures*, 6 pgs. (2000).

* cited by examiner

CONTROLLING A PROCESSOR RESOURCE BASED ON A COMPILE-TIME PREDICTION OF NUMBER OF INSTRUCTIONS-PER-CYCLE THAT WILL BE EXECUTED ACROSS PLURAL CYCLES BY THE PROCESSOR

TECHNICAL FIELD

This invention relates generally to reducing energy consumption in a microprocessor.

BACKGROUND

Microprocessors (referred to herein simply as "processors") consume energy during their operation. It is advantageous to reduce the amount of energy consumed, particularly in the case of devices that run off of limited power supplies.

Various factors affect the amount of energy that a processor consumes. For example, the frequency at which the processor operates and the size of the voltage supply that powers the processor contribute to processor energy consumption. Reducing the frequency of the processor or the voltage supply may decrease processor energy consumption; however, doing so may also adversely affect the performance of the processor.

Accordingly, there exists a need for a way of reducing processor energy consumption that does not have a significant adverse affect on processor performance. The reductions in energy consumption should also be scaleable, meaning that they can be implemented on processors having different architectures.

SUMMARY

The processor framework described herein addresses the foregoing need by providing energy savings without significant adverse affects on performance. The framework uses speculative static compile-time information to predict the number of instructions-per-cycle (IPC) that the processor will execute for particular source code. Based on the predicted IPC values, the framework controls (e.g., reduces operation of) processor resources that are needed to support the IPC. As a result, fewer processor resources are needed, thereby reducing processor energy consumption. Yet, there is no substantial corresponding decrease in performance. The framework is also scaleable between different processor architectures.

The invention can be used to save energy on any type of device that includes a processor. For example, the invention can be used to save energy on personal computers, devices containing embedded controllers, and hand-held devices, such as PalmPilots and cellular telephones.

In general, in one aspect, the invention is directed to a method (and corresponding processor framework and device), for use in a processor, which includes estimating a number of instructions-per-cycle that will be executed by the processor based on static compile-time information extracted during compilation, and controlling a resource of the processor based on the estimated number of instructions-per-cycle. This aspect may include one or more of the following features.

The resource may include components of the processor and controlling may include deactivating at least one of the components. Deactivating may be performed by clock gating the at least one component and/or voltage ($V_{DD}$) gating at least one component. Controlling may alternatively include throttling at least one of the components. Throttling may include adaptively changing a number of instructions that are processed by the component. The resource may include at least one of fetch, decode, issue, execute, and writeback logic units. Controlling may include throttling the fetch unit.

Estimating the number of instructions-per-cycle may be performed speculatively based on an architecture of the processor. The method may include providing data in an instruction that controls the resource. The data may indicate whether or not to control the resource. Controlling may be performed in response to the data in one instruction and/or in response to data in multiple instructions. The data may include at least one additional bit in each instruction, plural bits in the instructions, and/or at least one additional bit in less than all of the multiple instructions.

Estimating the number of instructions-per-cycle may include determining instruction-level parallelism in the instructions using the static compile-time information. Instruction level parallelism may be determined by locating instructions that can be executed independently at run-time. The independent instructions may be located by performing dependence testing on the instructions.

Estimating the number of instructions-per-cycle may include determining loop-level parallelism in the instructions using the static compile-time information. The loop-level parallelism may be determined by locating loops in the instructions. The loops may be located by retrieving a predetermined number of instructions and by examining the predetermined number of instructions for indications of loops. Estimating the number of instructions-per-cycle may take into account loop-level parallelism in the instructions if an architecture of the processor makes it possible to detect loop-level parallelism at run-time.

Estimating the number of instructions-per-cycle may include both estimating instruction-level parallelism in the instructions and estimating loop-level parallelism in the instructions. Estimating the number of instructions-per-cycle may also include analyzing a block of instructions to estimate independent instructions that can be executed in parallel and/or analyzing memory accesses in the instructions to estimate independent memory accesses.

In general, in another aspect, the invention is directed to a process for translating a computer program into an intermediate representation that includes control flow structures, annotating control flow structures in the intermediate representation, translating the intermediate representation into a flat format, performing an instructions-per-cycle analysis on the flat format, and adding control data into the instructions based on the instructions-per-cycle analysis. The flat format may contain annotations corresponding to the control flow structures. This aspect of the invention may include one or more of the following features.

The instructions-per-cycle analysis may include estimating a number of instructions-per-cycle that will be executed by a processor based on the flat format. The process may include controlling a resource of the processor based on the control data. The control data may include data added into existing instructions in an instruction set architecture and/or additional (non-pre-existing) instructions added to the instruction set architecture.

Estimating the number of instructions-per-cycle may include at least one of estimating instruction-level parallelism in the instructions using the flat format and estimating loop-level parallelism in the instructions using the flat format based on the annotations added in the intermediate representation.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In addition, the materials, methods, and examples are illustrative only and not intended to be limiting.

Other features and advantages of the invention will be apparent from the following detailed description, and from the claims.

DESCRIPTION

In the embodiments described herein, a processor framework, comprised of a compiler, an instruction set architecture (ISA) and a microarchitecture, uses speculative static information to reduce processor energy consumption. In brief, the compiler estimates an IPC for one or more sections of a computer program based on the speculative static information, the ISA exposes the IPC to execution layers in the microarchitecture, and the microarchitecture uses the IPC to control processor resources to provide energy-efficient program execution. Examples of processor resources that may be controlled include processor fetch and functional units.

Figure 1:
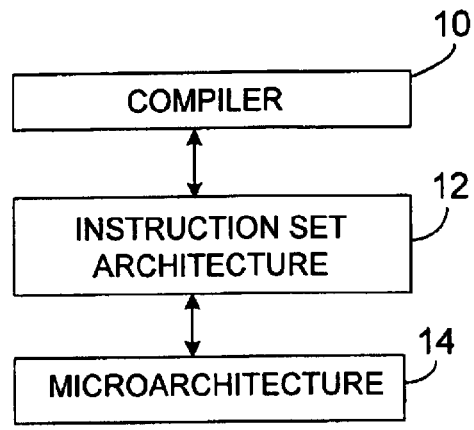
FIG. 1 is a block diagram of a processor framework, which includes a compiler, an instruction set architecture, and a microarchitecture.

Referring to FIG. 1, a compiler 10 is a software system (e.g., executable instructions stored in memory) that programs circuitry to translate computer program applications from high-level programming languages (e.g., C, C++, Java) into machine specific sequences of instructions. An instruction set architecture (ISA) 12 is a set of rules that defines the encoding of operations into the machine specific instructions. The ISA acts as the interface between compiler 10 and the microarchitecture 14.

A computer program is a collection of machine level instructions that are executed to perform a desired functionality. Microarchitectural (or architectural) components 14 are primarily hardware and/or software techniques that are used during execution of the program. The actual machine can be a microprocessor or any other device that is capable of executing instructions that conform to the encoding defined in the ISA.

Microarchitecture 14 can contain various components, including circuitry (logic) for performing instruction fetch, decode, issue, execute, memory write and register write/retrieve functions. The execution circuitry can include various functional units, such as multipliers, adders, logic operators, and the like. The framework uses speculative static information obtained by the compiler during compilation to control (e.g., throttle) the fetch unit and to control (e.g., deactivate) the functional units, as described below.

In the context of this disclosure, "throttling" refers to adaptively changing a number of instructions that are fetched by the fetch unit. Deactivating a functional unit may be performed by any number of methods, including clock gating, voltage ($V_{DD}$) gating, and the like. In this context "gating" means to discontinue or cut-off. For example, clock gating refers to cutting-off a clock signal, $V_{DD}$ gating to cutting-off a level of voltage, etc.

Compile-time refers to the time during which a computer program is translated from a high-level programming language into a machine-specific stream of instructions. Compile-time is not part of execution or run-time. Run-time is the time that it takes to execute translated machine instructions on the microarchitecture. Compilation is typically performed on a different host machine than execution.

The compilation process translates high-level source code to binary code. In doing so, the compilation process generates various "intermediate representations" of the original code. Near to the beginning of the compilation process, where the source code is introduced, is typically referred to as the "front end" of compilation. Near to the end of the compilation process, where the binary code is generated, is typically referred to as the "back end" of compilation. "Flat" code refers to an intermediate representation of the original code, which includes, e.g., labels, memory operations, and conditional branches, but not loops or other constructs, such as procedure calls, that refer back to earlier portions of the code.

Information collected during compilation is called static or compile-time information. Program analyses are performed during compile-time to analyze the program and extract static information. Program transformations (or optimizations) are performed during compile-time to modify the program typically to achieve some objective such as improvement in performance.

Static information is predictable if it can be shown during compilation that the information is true for any possible input set applied to the program, or for any possible execution of the program on a machine in question. Static information is speculative if the information extracted during compile-time is not shown or cannot be shown to be true for all possible execution instances. As such, the available (i.e., extractable) speculative static information is a superset of the available predictable static information in a program.

The processes described herein combine architecture and compiler techniques into a compiler-enabled, tightly integrated, compiler-architecture based system design. An approach is deemed compiler-enabled if the execution of specific instructions is managed to some extent by static information. This is beneficial, since static and static-dynamic energy reduction optimizations can be enabled.

Compiler

Figure 2:
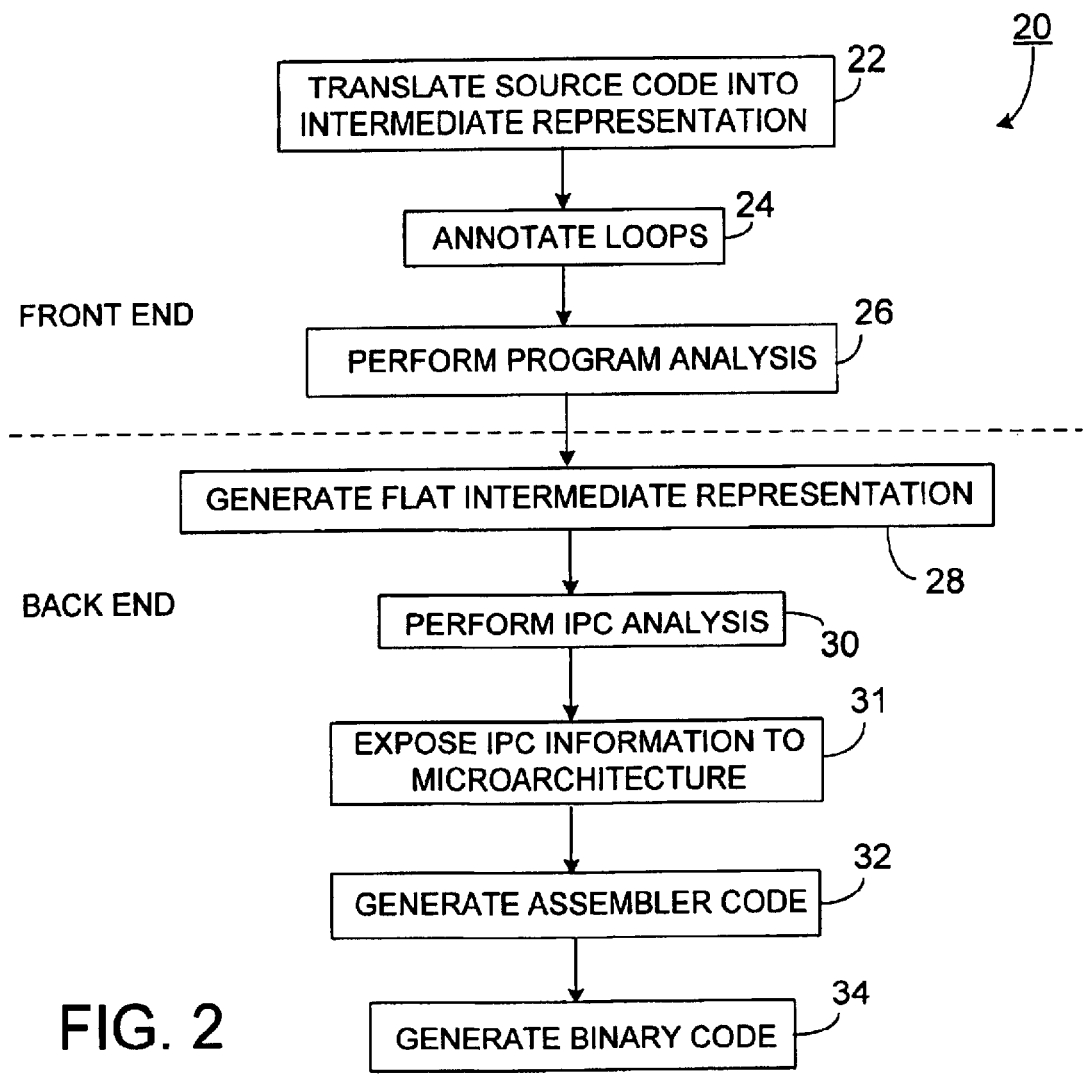
FIG. 2 is a flow chart showing a method of controlling processor resources.

FIG. 2 shows a process 20 performed by the compiler for controlling processor resources. The portion of process 20 marked "front end" occurs at or near the beginning of compilation and the portion of process 20 marked "back end" occurs at or near the end of compilation.

In process 20, the compiler estimates speculative static information from a computer program. Specifically, the compiler makes high-level passes over the code and performs machine-specific optimizations on the code. The high-level passes and machine-specific optimizations result (22) in an intermediate representation of the code. The intermediate representation has the same variables and structure as the original program, including the control flow structure and symbols of the original program. The control flow structure defines the flow of the program during execution and may include loops, procedural calls, recursive structures, and the like.

Additional compiler passes annotate the intermediate representation and propagate these annotations down the compilation process. In this embodiment, IPC estimation is performed at the loop level. Loop beginnings and endings serve as natural boundaries for IPC estimation. This is because a large portion of code execution occurs in the loops. As such, the loops account for much of the program IPC. The compiler annotates (24) the beginning and end of every loop in the code. This is done by traversing a control flow graph for each routine in the computer program to recognize the loops, and annotating the loops.

The annotations are propagated downward during compilation. What this means is that the annotations are preserved as the computer program is translated into lower-level intermediate representations. Accordingly, the annotations may be used to identify loops when the program reaches a low-level (flat) representation.

During another pass, the compiler performs (26) analyses and optimizations on a lower-level intermediate representation of the code. Following these analyses and optimizations, the compiler generates (28) an intermediate representation of the code having a flat format. This intermediate representation contains the annotations noted above, which identify loops in the code.

Another additional compiler pass, namely the IPC prediction pass, is a lower-level pass that is run closer (prior) to assembler code generation than the annotation pass. Scheduling the IPC prediction pass at this point ensures that no compiler level optimizations, which might result in instructions being moved and/or modified, are performed following the IPC prediction pass.

The compiler performs an IPC analysis (28) to estimate the IPC using the flat-format intermediate representation, and to insert IPC prediction annotations into the instructions. The IPC analysis includes estimating instruction-level parallelism in the instructions and, depending upon the architecture of the processor, also estimating loop-level parallelism in the instructions. It is noted that, in many processor architectures, instruction-level parallelism alone may be used to estimate the IPC.

In this context, estimating instruction-level parallelism includes locating, in a section/block of code, a number of independent instructions, meaning instructions that can be executed in parallel. The level of parallelism in the instructions is indicative of the IPC. That is, independent instructions can be executed in parallel using separate functional units. Accordingly, the more independent instructions that are identified (i.e., the higher the level of parallelism in the instructions), the higher the IPC (since more instructions-per-cycle can be executed). For example, if the compiler identifies two independent instructions, it can be predicted that the IPC in this case is two. The IPC over a period of time, or for a block of instructions, may be predicted, e.g., by averaging the number of independent instructions that occur during that period/block.

In the IPC analysis, the compiler identifies true data dependencies at memory and register accesses. Since the approach is speculative and is not required to be correct all the time, a straightforward memory dependence analysis may be performed at the instruction operand level in order to identify independent instructions in the code.

Dependence testing may be used to distinguish true dependencies from false dependencies. In a true dependency, one computation depends on the result of another computation. An example of a false dependency is one in which two computations are independent, but access the same address, as shown in the examples below.

By way of example, the two processor instructions:
  OR $2, $3, $4
  ADD $5, $7, $8
refer to performing a logical OR operation between the contents of registers "3" and "4" and storing the result in register "2"; and adding the contents of register "7" and register "8" and storing the contents in register "5". These two instructions are independent, since one computation is not dependent on the other computation.

Examples of true dependent processor instructions are:
  OR $2, $3, $4
  ADD $4, $2, $8
since the content of register "2", obtained via the logical OR operation, is used during the ADD operation.

During the dependence testing process, the compiler may identify any false dependencies. An example set of false dependent instructions is:
  OR $2, $3, $4
  ADD $2, $7, $8
These two instructions both write to register "2"; however, they are not dependent in the sense that one operation depends on the results of the other operation. The compiler may recognize these false dependencies, estimate how to change them, and provides the result to the microarchitecture. This is referred to as "register renaming". The microarchitecture performs register renaming dynamically, at run time.

In the example above, the hardware may change the second instruction to read
  ADD $10, $7, $8
thereby causing the result of the addition of registers "7" and "8" to be stored in register "10", not register "2".

Dependence testing may be performed as follows. During the IPC prediction compiler pass, the intermediate representation of the program is divided into annotation blocks. Each block carries a unique annotation at the beginning of the block, which is a count of the instructions in the block. Whenever the compiler comes across a true data dependency, the compiler ends the block. All of the instructions in the block, except the last instruction, can potentially be processed in the same clock cycle. Each prediction block ends at the beginning and end of each loop. This implicitly constitutes a simple static branch prediction mechanism. That is, by terminating the IPC-prediction block at the loop boundaries, the compiler assumes that the loop branch is likely to be taken.

True data dependencies are determined statically using an assembly-code level data dependency analysis. The advantage of doing the analysis at this level (instead of at the source code level) is that instruction level parallelism is fully exposed at the assembly code layer. The process uses monotone data flow analyses to identify the data dependencies. The process is speculative and, therefore, does not require complete correctness.

Data dependencies are identified at both register and memory accesses. Register analysis is straightforward. The read and written registers in an instruction can be established easily, since registers do not have aliases. However, for memory accesses, this is not the case and there are three implementation choices: no alias analysis, complete alias analysis, or alias analysis by instruction inspection. The compiler in this embodiment uses alias analysis by instruction inspection.

Alias analysis by instruction inspection provides ease of implementation and sufficient accuracy. The analysis distinguishes between different classes of memory accesses, such as static or global memory, stack and heap. The analysis also considers indexed accesses by analyzing the base register and offset values to determine if different memory accesses are referenced. If this is the case, the target pair of read-after-write memory accesses are not considered to be true dependencies.

Memory accesses may be assumed to be independent instructions depending on the circumstances. Memory accesses that have a high likelihood, as determined by the speculative static information, are assumed to be independent. For example, $A(B(i))$ and $A(C(j))$ will be assumed to relate to independent memory accesses, since the only time that they will be dependent (i.e., write to the same location) is if B(i) equals C(j). This occurs only a small percentage of time. An inaccurate prediction here will adversely affect the IPC analysis; however, the effect will not be significant. In the worst case, the processor may run a block of code at a lower IPC, which may affect its speed but not the correctness of execution.

Referring back to FIG. 2, in the IPC analysis, the compiler performs a pass to locate the IPC prediction annotations, and to insert a marker instruction for each IPC prediction annotation. In another pass, the compiler inserts throttling flags into the code. The throttling flags are inserted at the points of the marker instructions. It is these flags, not the marker instructions, that are passed to the microarchitecture. Each flag only requires a single bit. The flags can be inserted directly into the instructions stream for the code, provided there is sufficient flexibility in the ISA.

During IPC analysis (28), the compiler may also estimate loop-level parallelism in the instructions. In a loop, two types of parallelism may be estimated. One type of parallelism includes parallel instructions inside a loop, i.e., within a single iteration of a loop. Another type includes parallelism across different iterations of the same loop.

Loop-level parallelism is only identifiable in processors that can fetch a sufficient number of instructions to identify loops in the code, that have the ability to reorder instructions, and that have the ability to rename instructions to identify such parallelism. Some types of processors fetch smaller numbers of instructions at a time for processing. In these cases, loop-level parallelism may not be identifiable.

Accordingly, in processors with architectures that permit fetching of a sufficient number of instructions, the compiler may identify loops in the instructions, and thus provide a more accurate indication of the level of parallelism in the code. The loops are identified by retrieving a predetermined number of instructions and examining the instructions for the annotations added above and the likelihood of parallelism between iterations.

In addition to, or instead of, analyzing loops, the compiler may select blocks of instructions at various granularities (i.e., sizes). The compiler may identify independent instructions in those blocks in the manner described above and then determine the IPC.

Instruction Set Architecture

Referring to FIG. 2, the compiler exposes (31) the IPC information to the microarchitecture by extending the ISA. That is, the information which allows the microarchitecture to throttle the fetch unit and to deactivate the functional unit is provided to the microarchitecture via the ISA. This may be done by adding data to the ISA.

The data added to the ISA controls throttling of the fetch unit (or other logic units) and deactivation (e.g., clock gating) of the functional units based on the predicted IPC. The data may include one or more bits in each instruction or only in specific instructions. More bits enables more comprehensive control over the operation of the functional units. For example, if an instruction contains only a single additional bit, that bit may be used to turn-on or shut-off a single functional unit (or a predetermined set of functional units) and to throttle the fetch unit on/off. However, using more than one bit permits greater control over the functional units and the fetch unit. For example, if there are four functional units and two bits are added to instructions in the ISA, there results in four possible bit combinations, each of which may be used to control one of the four functional units.

Instead of adding additional bit(s) in each instruction, the compiler may add at least one additional bit in every number of instructions, e.g., every Nth (N≧2) instructions or at different granularities, e.g., at each basic block of the program. Thus, it is possible to control processor resources periodically by including the additional data in less than all of the instructions.

In addition, the compiler may create new instructions for controlling processor resources and add those new instructions to the ISA. This may be done in addition to, or instead of, modifying the existing ISA as above.

After the compiler exposes the IPC information to the microarchitecture, the compiler generates (32) low-level assembler-like code from the resulting instructions and generates (34) executable binary code.

Microarchitecture

Figure 3:
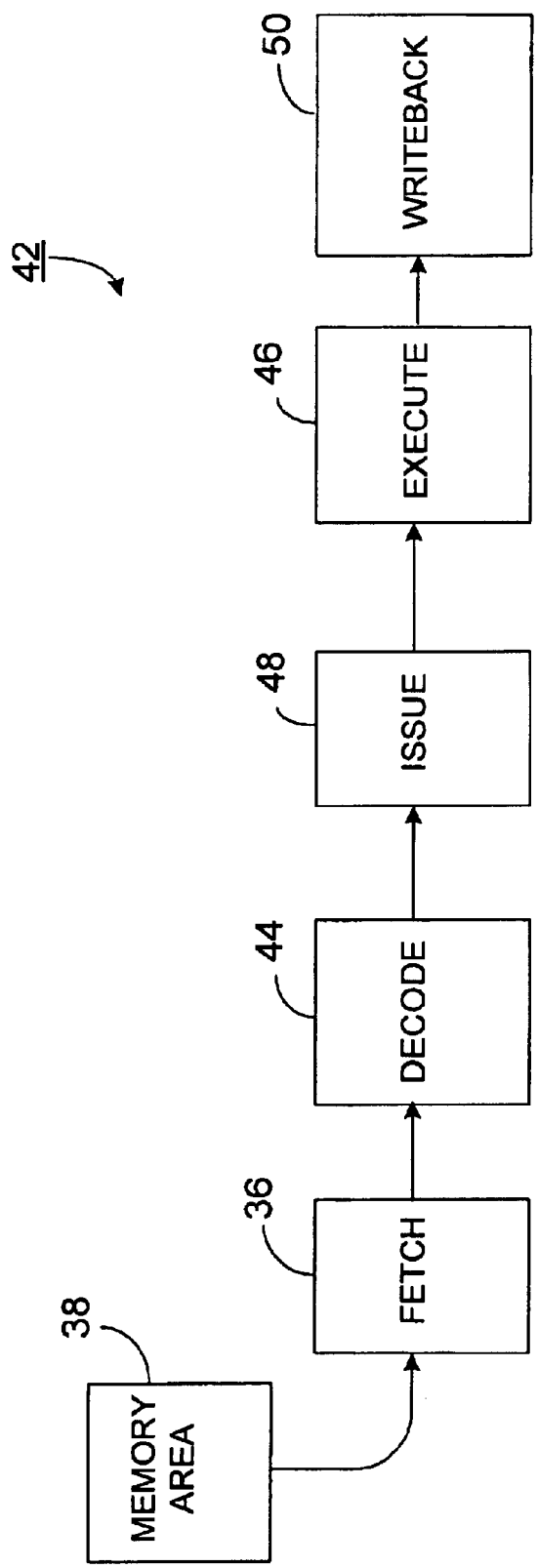
FIG. 3 is a block diagram of a processing pipeline that may be controlled by the method of FIG. 2.

The processor framework uses the static IPC information, which is encoded in the ISA, to throttle the fetch unit in the microarchitecture. FIG. 3 shows a typical processor pipeline 42, which includes fetch unit 36, decode unit 44, issue unit 48, execution unit 46, and writeback unit(s) 50.

Fetch unit 36 retrieves information from a memory area 38, such as an instruction cache. Decode unit 44 decodes the instructions and passes the resulting decoded instructions to execution unit 46. Execution unit 46 contains various functional units, such as multipliers, adders, logic operators and the like (not shown). These functional units issue and execute the decoded instructions and pass the results and the instructions and writeback unit(s) 50.

The fetch throttling process implemented by the processor framework controls the amount of instructions that are retrieved by the fetch unit based on IPC information encoded into the instruction stream. The fetch unit is stopped (i.e., throttled) at various points during its operation based on the IPC, thereby preventing the fetch unit from retrieving additional instructions. Throttling the fetch unit reduces the amount of power consumed by the fetch unit and, therefore, the amount of power consumed by the processor. In addition, throttling the fetch unit reduces the amount of processing performed in the other units further down the pipeline than the fetch unit. Since fewer instructions are retrieved by the fetch unit, these other units have fewer instructions to process, resulting in less energy consumption. Thus, additional power savings are achieved.

The fetch-throttling process latches the compiler-supplied predicted IPC at the decode unit (e.g., decode unit 44). If the predicted IPC is below a predetermined threshold, then the fetch unit is throttled, i.e., a new instruction fetch is stopped for a specified duration of clock cycles. The rationale for doing this is that frequent true data dependencies, which are at the core of the IPC prediction process, will cause processing of instructions in the pipeline to stall. The fetch unit thus can be throttled to relieve instruction cache and fetch queues, thereby allowing previously-retrieved instructions to be processed and saving power without a high performance penalty. In this embodiment, a threshold of two and duration of one are used. That is, the framework stops instruction fetch for one cycle when an IPC prediction is encountered that is at most two.

In addition to the fetch unit, the decode, issue, execute, and writeback units may also be controlled. For example, functional units in the execution unit may be deactivated, resulting in further energy savings. By way of example, if there are four functional units and an IPC of two, only two functional units may be required to process the instructions in parallel. The remaining two functional units may be deactivated, without affecting the performance of the processor. Deactivating these two functional units reduces processor energy consumption. In this embodiment, the functional units may be deactivated by clock gating. Clock gating reduces the number of dynamic transitions in the processor's functional units, thereby reducing energy consumption. In other embodiments, it is possible to deactivate the functional units through voltage (VDD) gating or other processes.

Figure 4:
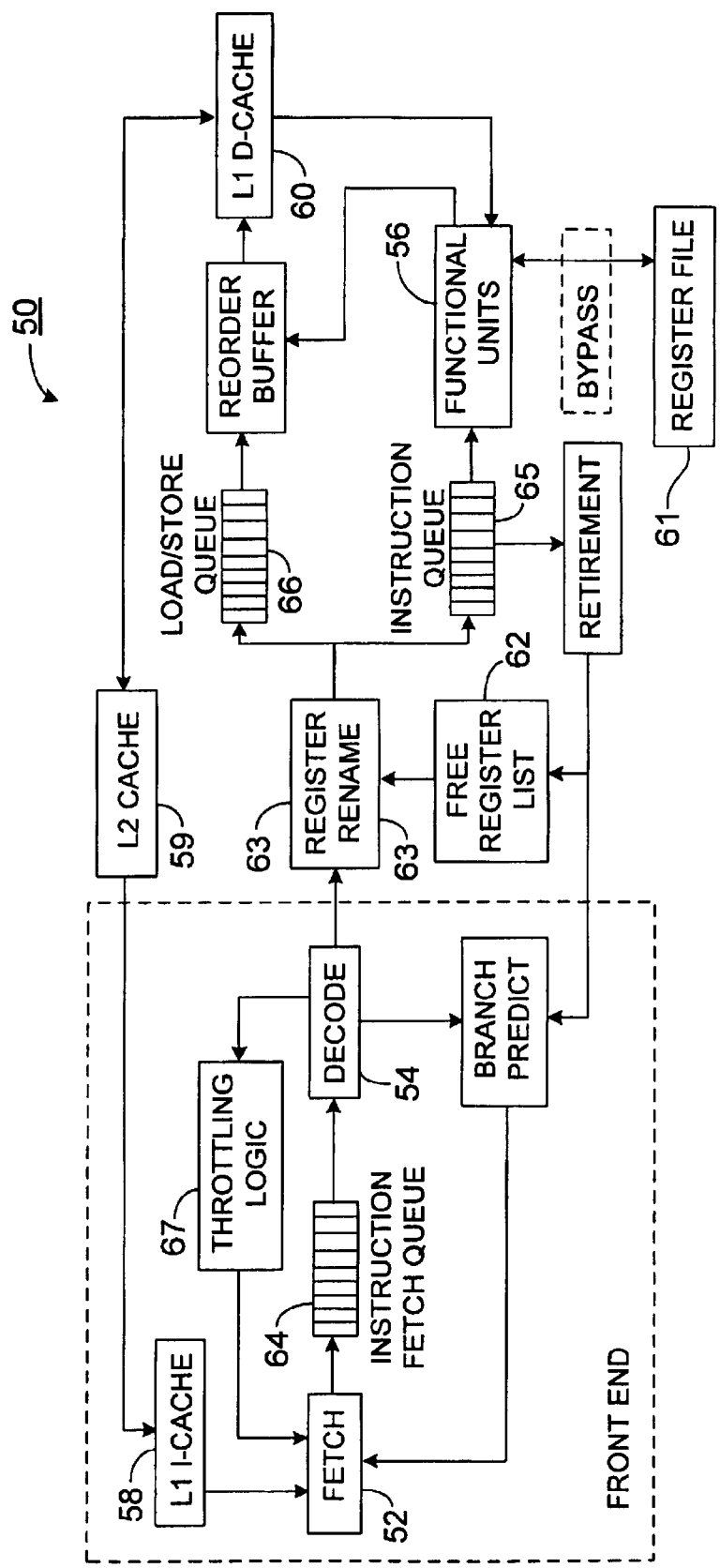
FIG. 4 is a block diagram of a processor microarchitecture for controlling processor resources.

Referring to FIG. 4, an architecture 50 is shown on which the fetch throttling process described herein may be implemented. The architecture includes instruction fetch unit 52, decode unit 54, functional units 56, various caches 58 to 60, register-related blocks 61 to 63, queues 64 to 66, and throttling logic 67. In operation, instructions are fetched by fetch unit 54 and stored temporarily in instruction fetch queue 64. Throttling logic 67 performs the microarchitecture portion of the fetch throttling process described herein. From instruction fetch queue 64, the instructions are transferred to decode unit 54, where they are decoded and passed to register rename unit 63. The instructions may then pass the functional units 56 (via instruction queue 65), where they are executed. The instructions, and results, may then be written back to memory or a register.

Figure 5:
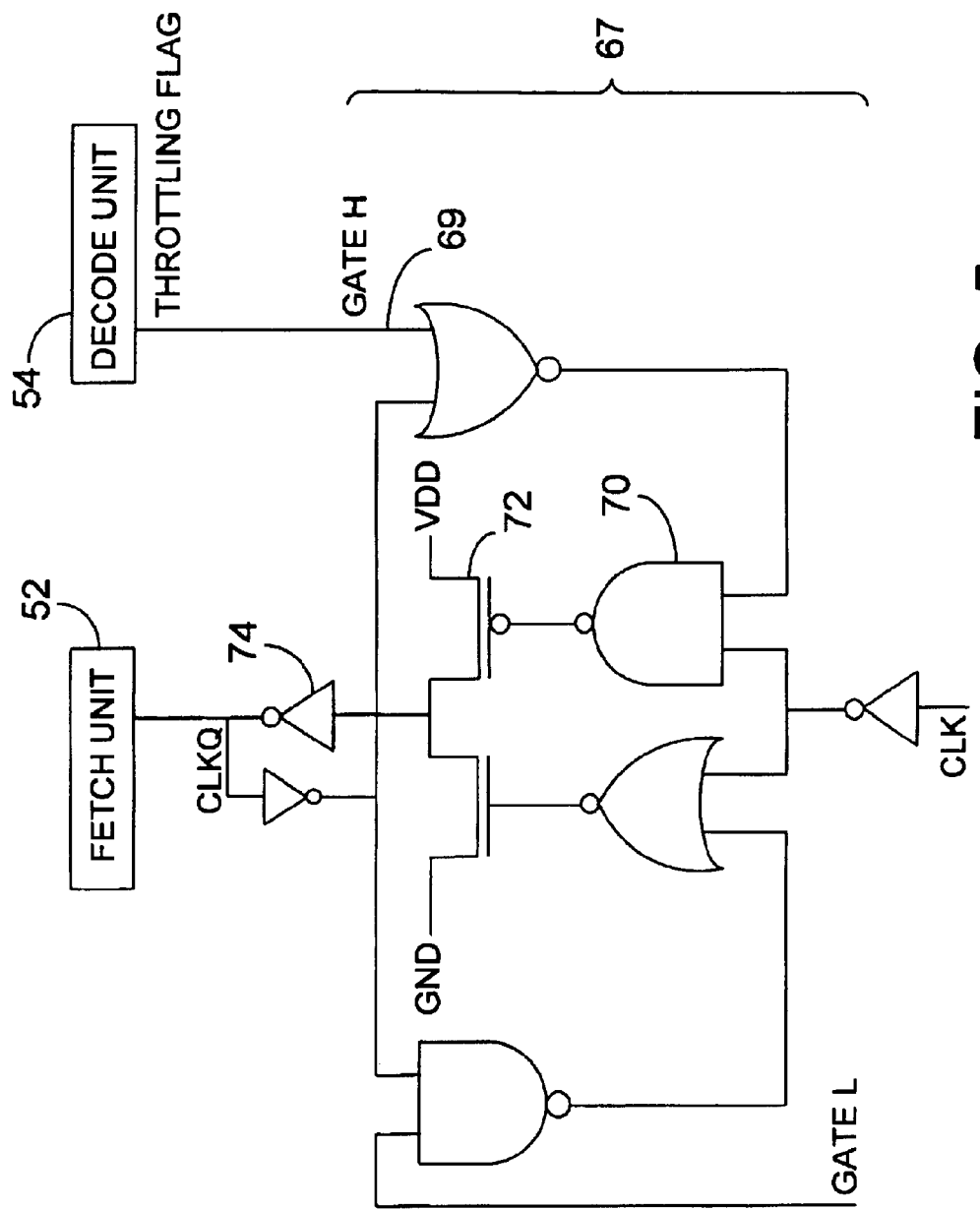
FIG. 5 is a block diagram of control logic used in the microarchitecture of FIG. 4.

FIG. 5 shows the throttling logic 67 in more detail. When the throttling flag is set, GATEH 69 is asserted and the fetch stage is throttled via NAND gate 70, transistor 72, and inverter 74. In this embodiment, low setup clock gating logic is used, which allows a qualifier to be asserted up to 400 picoseconds (ps) after the rising edge of the clock without producing a pulse.

Other Embodiments

The invention is not limited to the specific embodiments described herein. For example, the invention is not limited to the architectures shown in FIGS. 4 and 5. The invention is not limited to controlling via throttling, clock gating and voltage gating. Other types of controls may be used. The invention is not limited to use with the logic units and functional units described herein. Rather, it may be used to control any appropriate component of a processor. The blocks of FIG. 2 may be performed in a different order in other embodiments.

Other embodiments not described herein are also within the scope of the following claims.

What is claimed is:

1. A method, for use in a processor, the method comprising:
    estimating a number of instructions-per-cycle that will be executed across plural cycles by the processor based on static compile-time information extracted during compilation, wherein an estimated number of instructions-per-cycle comprises a compile-time prediction of likely instructions executed per-cycle at run-time for a segment of code; and
    controlling a resource of the processor based on the estimated number of instructions-per-cycle.
2. The method of claim 1, wherein the resource comprises components of the processor; and
    wherein controlling comprises deactivating at least one of the components.
3. The method of claim 2, wherein deactivating is performed by clock gating the at least one component.
4. The method of claim 1, wherein the resource comprises components of the processor; and
    controlling comprises throttling at least one of the components.
5. The method of claim 4, wherein throttling comprises adaptively changing a number of instructions that are processed by the at least one component.
6. The method of claim 1, wherein the resource comprises at least one of fetch, decode, execute, issue, and writeback logic units.
7. The method of claim 6, wherein controlling comprises throttling the fetch unit.
8. The method of claim 1, wherein estimating is performed speculatively based on an architecture of the processor.
9. The method of claim 1, further comprising:
    providing data in an instruction that controls the resource, the data indicating whether or not to control the resource;
    wherein controlling is performed in response to the data.
10. The method of claim 9, wherein:
    controlling is performed in response to data in multiple instructions; and
    the data comprises at least one additional bit in each of the multiple instructions.
11. The method of claim 10, wherein the data comprises plural bits in the multiple instructions.
12. The method of claim 9, wherein:
    controlling is performed in response to data in multiple instructions; and
    the data comprises at least one additional bit in less than all of the multiple instructions.
13. The method of claim 12, wherein the data comprises plural bits in less than all of the instructions.
14. The method of claim 1, wherein estimating comprises determining instruction-level parallelism in the instructions using the static compile-time information.
15. The method of claim 14, wherein determining comprises locating instructions that can be executed independently at run-time by the processor.
16. The method of claim 15, wherein independent instructions are located by performing dependence testing on the instructions.
17. The method of claim 1, wherein estimating comprises determining loop-level parallelism in the instructions using the static compile-time information.
18. The method of claim 17, wherein determining comprises locating loops in the instructions.
19. The method of claim 18, wherein the loops are located by:
    retrieving a predetermined number of instructions; and
    examining the predetermined number of instructions for indications of loops.
20. The method of claim 1, wherein estimating takes into account loop-level parallelism in the instructions if an architecture of the processor makes it possible to detect loop-level parallelism at run-time.
21. The method of claim 1, wherein estimating comprises:
    estimating instruction-level parallelism in the instructions; and
    estimating loop-level parallelism in the instructions.
22. The method of claim 1, wherein estimating comprises analyzing a block of instructions to estimate independent instructions that can be executed in parallel.
23. The method of claim 1, wherein controlling comprises cutting-off a level of voltage to the resource.
24. The method of claim 1, wherein estimating comprises analyzing memory accesses in the instructions to estimate independent memory accesses.
25. A processor framework comprising:
    a compiler which estimates a number of instructions-per-cycle that will be executed across plural cycles by a processor based on static compile-time information extracted during compilation, wherein an estimated number of instructions-per-cycle comprises a compile-time prediction of likely instructions executed per-cycle at run-time for a segment of code; and
    a microarchitecture which controls a resource of the processor based on the estimated number of instructions-per-cycle.

26. The processor framework of claim 25, wherein the resource comprises components of the processor; and
wherein controlling comprises deactivating at least one of the components.

27. The processor framework of claim 26, wherein deactivating is performed by clock gating the at least one component.

28. The processor framework of claim 25, wherein the resource comprises components of the processor; and
controlling comprises throttling at least one of the components.

29. The processor framework of claim 28, wherein throttling comprises adaptively changing a number of instructions that are processed by the at least one component.

30. The processor framework of claim 25, wherein the resource comprises at least one of fetch, decode, execute, issue, and writeback logic units.

31. The processor framework of claim 30, wherein controlling comprises throttling the fetch unit.

32. The processor framework of claim 25, wherein estimating is performed speculatively based on an architecture of the processor.

33. The processor framework of claim 25, further comprising:
an instruction set architecture that includes data in an instruction that controls the resource, the data indicating whether or not to control the resource;
wherein controlling is performed in response to the data.

34. The processor framework of claim 33, wherein:
controlling is performed in response to data in multiple instructions; and
the data comprises at least one additional bit in each of the multiple instructions.

35. The processor framework of claim 34, wherein the data comprises plural bits in the multiple instructions.

36. The processor framework of claim 33, wherein:
controlling is performed in response to data in multiple instructions; and
the data comprises at least one additional bit in less than all of the multiple instructions.

37. The processor framework of claim 36, wherein the data comprises plural bits in less than all of the instructions.

38. The processor framework of claim 25, wherein estimating comprises determining instruction-level parallelism in the instructions using the static compile-time information.

39. The processor framework of claim 38, wherein determining comprises locating instructions that can be executed independently at run-time by the processor.

40. The processor framework of claim 39, wherein independent instructions are located by performing dependence testing on the instructions.

41. The processor framework of claim 25, wherein estimating comprises determining loop-level parallelism in the instructions using the static compile-time information.

42. The processor framework of claim 41, wherein determining comprises locating loops in the instructions.

43. The processor framework of claim 42, wherein the loops are located by:
retrieving a predetermined number of instructions; and
examining the predetermined number of instructions for indications of loops.

44. The processor framework of claim 25, wherein estimating takes into account loop-level parallelism in the instructions if an architecture of the processor makes it possible to detect loop-level parallelism at run-time.

45. The processor framework of claim 25, wherein estimating comprises:
estimating instruction-level parallelism in the instructions; and
estimating loop-level parallelism in the instructions.

46. The processor framework of claim 25, wherein estimating comprises analyzing a block of instructions to estimate independent instructions that can be executed in parallel.

47. The processor framework of claim 25, wherein controlling comprises cutting-off a level of voltage to the resource.

48. The processor framework of claim 25, wherein estimating comprises analyzing memory accesses in the instructions to estimate independent memory accesses.

49. A device comprising:
a microarchitecture which controls a resource of the device based on an estimated number of instructions-per-cycle, the estimated number of instructions-per-cycle being determined by a compiler which estimates a number of instructions-per-cycle that will be executed by the device across plural cycles based on static compile-time information extracted during compilation, wherein the estimated number of instructions-per-cycle comprises a compile-time prediction of likely instructions executed per-cycle at run-time for a segment of code.

50. The device of claim 49, wherein the resource comprises at least one of a fetch unit and a functional unit.

51. A method, for use in a processor, the method comprising:
estimating a number of instructions-per-cycle that will be executed by the processor across plural cycles based on static compile-time information extracted during compilation, wherein an estimated number of instructions-per-cycle comprises a compile-time prediction of likely instructions executed per-cycle at run-time for a segment of code;
adding, to an instruction stream executed by the processor, information relating to the estimated number of instructions-per-cycle; and
controlling a resource of the processor based on the information.

* * * * *